Figure 1:
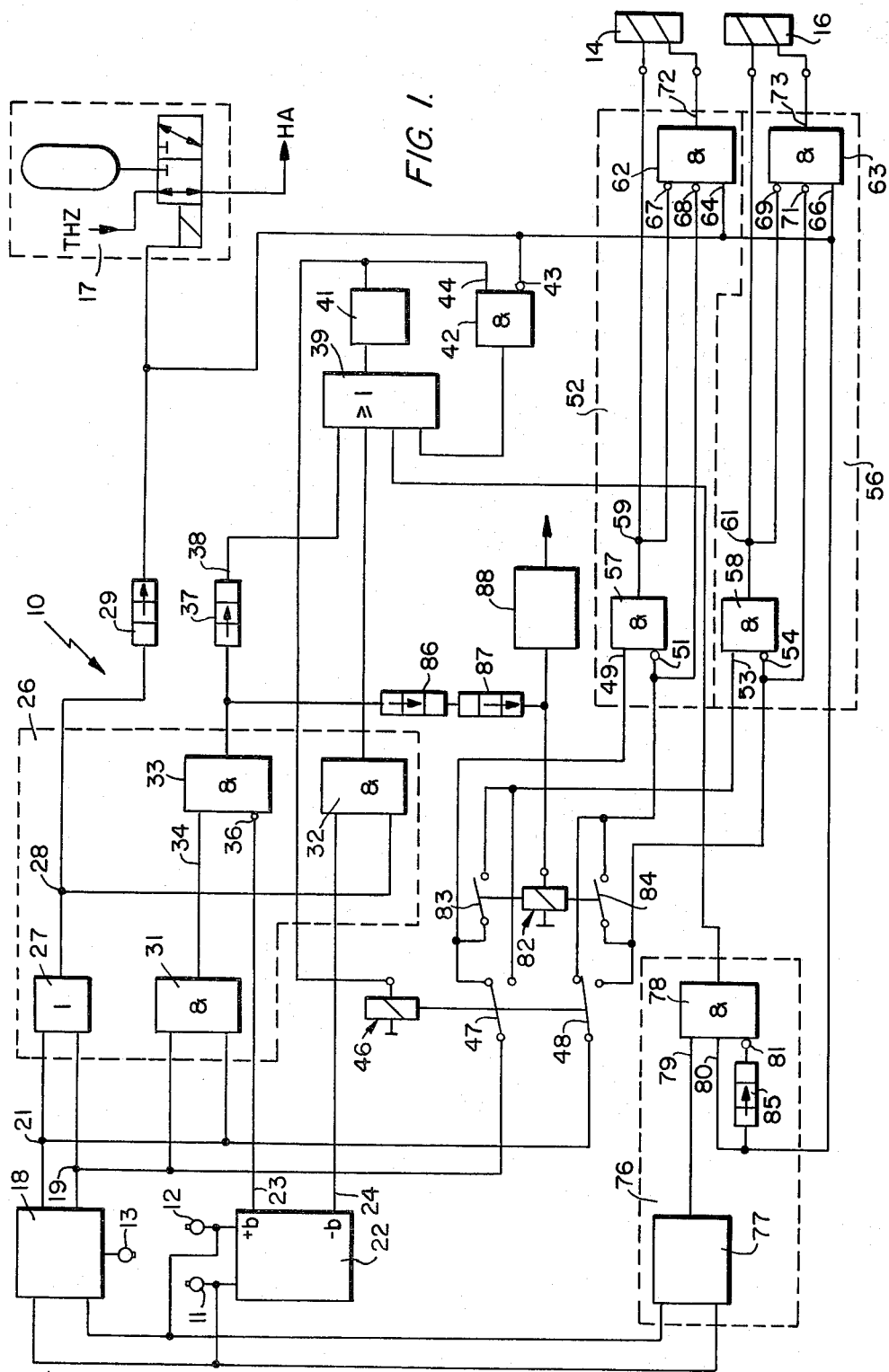

United States Patent [19]

Burckhardt et al.

[11] Patent Number: 4,480,309

[45] Date of Patent: Oct. 30, 1984

[54] DRIVE CONTROL DEVICE FOR A MOTOR VEHICLE WHICH IS ALSO EQUIPPED WITH AN ANTI-BLOCKING SYSTEM

[75] Inventors: Manfred Burckhardt, Waiblingen; Jürgen Paul, Stuttgart; Franz Brugger, Winnenden, all of Fed. Rep. of Germany

[73] Assignee: Daimler-Benz Aktiengesellschaft, Fed. Rep. of Germany

[21] Appl. No.: 434,396

[22] Filed: Oct. 14, 1982

[30] Foreign Application Priority Data

Oct. 15, 1981 [DE] Fed. Rep. of Germany ....... 3140959

[51] Int. Cl.$^3$ .............................................. B60T 13/68
[52] U.S. Cl. ...................................... 364/426; 303/93; 303/96; 303/111
[58] Field of Search ..................... 364/426; 303/93, 96, 303/111, 97

[56] References Cited

U.S. PATENT DOCUMENTS

| 4,088,376 | 5/1978 | Lindemann et al. | 303/96 |
| 4,093,317 | 6/1978 | Lindemann et al. | 303/111 |
| 4,291,924 | 9/1981 | Leiber et al. | 303/111 |

Primary Examiner—J. V. Truhe
Assistant Examiner—Saul M. Bergmann
Attorney, Agent, or Firm—Craig & Burns

[57] ABSTRACT

A drive control device for a motor vehicle with rear axle drive and equipped with an anti-blocking system. As part of a rotational speed sensor arrangement provided to determine the state of movement of the vehicle wheels, each of the non-driving front wheels has an associated rotational speed sensor and the two rear wheels have a common rotational speed sensor, which measures the rotational speed of the propeller shaft in the transmission system. A hydraulic actuator provided for brake pressure control corresponds in construction to that of a 4 channel anti-blocking system. These components are utilized for both the drive control and the anti-blocking control. An electronic control system of the drive control device, which processes the output signals of the rotational speed sensors, initially activates the right-hand rear wheel brake, as soon as a driving wheel starts to spin. If the vehicle does not accelerate in consequence or if, indeed, there is a deceleration of the vehicle, switching occurs to the left-hand driving wheel brake either with a time delay or immediately. If necessary, both driving wheel brakes are activated with a time delay and the engine torque withdrawn. In the case of travel around a curve, the control cycle is introduced by braking the driving wheel on the inside of the curve.

15 Claims, 2 Drawing Figures

DRIVE CONTROL DEVICE FOR A MOTOR VEHICLE WHICH IS ALSO EQUIPPED WITH AN ANTI-BLOCKING SYSTEM

The invention concerns a drive control device for a motor vehicle which is also equipped with an anti-blocking system, the wheel rotational speed sensors of which provided to determine the state of movement of the driving and non-driving wheels are used for analogous purposes within the drive control device, which drive control device includes brake pressure control valves which are individually associated with the brakes of the driving wheels of the vehicle and are electrically controllable into a pressure-increasing, a pressure-reducing and also, in some cases, a pressure-retaining phase and also includes an electronic control unit, which processes the output signals from the wheel rotational speed sensors to produce control signals by means of which the brake pressure control valves can be directed into the functional positions corresponding to the purpose in the order and combination necessary for the drive control, in which positions an auxiliary pressure source is connected to the brake calipers of the wheel currently requiring braking and shut off from the brake calipers of the wheel not requiring braking.

A drive control device for a motor vehicle which operates on the principle that a driving wheel tending to spin is slowed down by activating its wheel brake and by appropriate control of the brake pressure operating on this wheel to the extent that slip occurring on this driving wheel remains within a tolerable range with both good drive acceleration and good driving stability—such a device, considered on its own, is associated with a technical effort corresponding, at least approximately, to that required for an anti-blocking system which operates on the principle that the slip occurring at the braked wheels is kept within a tolerable range by appropriate brake pressure control at the wheel brakes with good braking deceleration and also good driving stability and steering.

Since the wheel rotational speed sensors provided for determining the state of movement of the vehicle wheels and the brake pressure control valves provided for controlling the brake pressure in an anti-blocking system can also be used, by virtue of their structure and function, for an analogous purpose for drive control, the realization of a drive control device in combination with an anti-blocking system appears to be the most sensible solution technically and economically.

Assuming that the anti-blocking system is, for example, designed as a so-called 4 channel system and that the vehicle wheels are individually associated with wheel rotational speed sensors and brake pressure control valves, the latter, together with a return pump, being built up into a compact constructional unit, the extra technical effort required for the drive control device is substantially limited to an additional electronic control unit and an auxiliary pressure source, which provides the pressure for the driving wheel brakes during the control phases of the drive control device. This additional effort can be kept favorably low overall by ensuring that the control unit of the anti-blocking system is sub-divided into functional units in such a way that, for example, input signal processing stages of this control unit can also be used for purposes within the electronic control unit of the drive control device and that a pressure accumulator is used as the auxiliary pressure source for the drive control device. This accumulator can be charged during the normal braking phases of the vehicle, during which the anti-blocking system is not effective, by activating the return pump of the latter so that, in this respect also, the additional effort remains minimal for the hydraulic actuator of the drive control device. A precondition, however, is that the anti-blocking system is a relatively generous design of a 4 channel system.

However, if the anti-blocking system is designed as a so-called 3 channel system, for technical and economic reasons particularly advantageous for motor vehicles with rear axle drive, which operates with separate rotational speed monitoring and brake pressure control on the non-driving front wheels and with common rotational speed monitoring and brake pressure control on the driving rear wheels, only one rotational speed sensor being associated with the driven rear-axle, which measure the rotational speed of the propeller shaft transferring the engine torque to the differential, via which the driving rear wheels are drive-connected with it, and only one brake pressure control valve is provided as part of the anti-blocking system, by means of which the brake pressure is controlled for both rear wheel brakes, then the additional technical effort required to realize a drive control device is substantially greater. In order to be able to achieve brake pressure control on both brakes of the vehicle driving wheels—as is absolutely necessary for drive control—a further brake pressure control valve is necessary in any event as an additional hydraulic component. Since a functionally correct separate control of the brake pressure at the two driving wheels also presumes corresponding information about their state of movement, additional measures must be taken in this respect also as part of the drive control device. For this purpose, two wheel rotational speed sensors in place of one single rotational speed sensor are provided for measuring the rotational speed of the propulsion shaft; the state of movement of the driving vehicle wheels can then be determined individually. The technical effort then required would be the same overall as for a drive control device combined with a 4 channel anti-blocking system. To this must be added the fact that apart from the not unsubstantial additional cost for a fourth rotational speed sensor, the characteristic advantage of a 3 channel anti-blocking system—simple installation of a single rotational speed sensor on the casing of the differential—would disappear with the result that, compared with the 3 channel anti-blocking system, a substantially more complicated and thus also more expensive rear axle design would be necessary.

According to the invention, the drive control device causes braking of one of the driving wheels of the vehicle as soon as a $\lambda$ and/or $(+b)$ output signal of a first analysis stage, which compares the output signal of the rotational speed sensor associated with the driving shaft with the output signal of at least one of the wheel rotational speed sensors associated with the non-driving wheels, indicates that a threshold value considered critical of the slip $\lambda$ and/or the wheel acceleration has been exceeded by at least one of the driving wheels; the information on which driving wheel was tending to spin when the braking process was released is then found by monitoring the movement behavior of the motor vehicle resulting from the activation of one driving wheel brake. If a forward acceleration of the vehicle occurs after the activation of this wheel brake, whether on moving away or from a travelling condition of even movement, the control unit of the drive control device evaluates this in the sense that the wheel brake of the wheel tending to spin has been activated and is now providing the correct brake pressure control at this driving wheel from the point of view of the drive control. If the first activation of one of the drive wheel brakes, for example when driving away, does not produce forward acceleration, the control electronics evaluate this as an indication that the driving wheel not tending to spin has been braked and, after a suitable delay time, the wheel brake of the other driving wheel will, consequently, be activated. If, when travelling, measurable (for example by an accelerometer) vehicle deceleration appears due to the first activation of a driving wheel brake, which is an indication that the driving wheel not tending to spin must have been braked, the control electronics immediately react with an output signal, which now activates the other wheel brake. If the state of movement of the vehicle when travelling does not change at first, after first one of the driving wheel brakes has been activated, the control electronics switch over to the other driving wheel brake, again with a fixed time delay.

The drive control device according to the invention recognizes the driving wheel to be braked from the reaction of the vehicle to the first braking of one driving wheel and provides, at the latest after the elapse of a small delay time, control of the wheel brake of the driving wheel tending to spin. Compared with a 4 channel system, this must indeed involve accepting rather more inertia in control behavior, but only in cases which are, in any case, uncritical, that is, when driving away or in the case of a steady even movement of the vehicle. On the other hand, in the case where the "wrong" driving wheel brake operates first while traveling, this is recognized immediately from the associated deceleration of the vehicle and the "correct" wheel brake selected.

The main advantage provided by the invention consists in the fact that the rotational speed sensor arrangement characteristic of a 3 channel anti-blocking system, which, used alone, represents a technical/economical optimum, can be used without modification for an effective drive control device satisfying practical requirements and that such a device can therefore be realized in a simple manner in combination with a conventional 3 channel anti-blocking system.

By arranging the drive control device in accordance with the features of the invention, effective drive control is guaranteed even in cases where only small and/or trivially different connecting force coefficients are present at both driving wheels between the latter and the roadway.

It is also advantageous, according to the invention, if the drive control device is designed so that during a control cycle, the first driving wheel to be braked is the one on the side of the vehicle where a more frequent tendency to spin is to be expected as a statistical average on the basis of traffic and roadway conditions.

In a preferred embodiment of the drive control device according to the invention, the latter includes a curved path recognition device, which, if the drive control acts while travelling in a curve, causes initial activation of the wheel brake on the driving wheel at that moment on the inside of the curve, this wheel being generally the first with a tendency to spin in a curved path situation. This embodiment of the drive control device according to the invention has the effect that the drive control device causes at the outset the activation of the wheel brake of the driving wheel first tending to spin in by far the greatest number of cases.

The features of the invention provides special embodiments of the analysis stages provided in the control unit of the drive control device. These stages process the output signals of the rotational speed sensors to (+b) and λ signals, which indicate that at least one of the driving vehicle wheels tends to spin and process the output signals of the wheel rotational speed sensors associated with the non-driving vehicle wheels to (+b) and (−b) output signals characteristic of the state of movement of the vehicle as a whole, which contain the information as to how the vehicle is reacting to the initial drive control phase being applied.

The invention also provides a simple logic circuit device, which produces high and low level output signals from a connection of the output signals of the previously mentioned analysis stages, by which the activation of the driving wheel brakes is controllable, whereby the output signal of the sub-unit to be described provides the connection of the auxiliary pressure source of the drive control device to the braking circuit of the driving vehicle wheels and determines the length of a drive control cycle.

The invention also provides the function and form of a switch device controllable by the output signals of the connection stage and two connection circuits individually associated with the brake pressure control valves, by means of which the brake pressure control valves can be controlled in their various functional positions in the correct order and combination for control utilizing the output signals of the (+b) and signal analysis stage.

According to another advantageous feature of the invention provides a simple possibility for functionally correct switching from one driving wheel brake to the other.

An additional feature of the invention provides a special embodiment of the connection circuits associated individually with the brake pressure control valves; these circuits, using a connection between the characteristic signals for the state of movement of the driving vehicle wheels overall, produce the function control signals, by means of which the brake pressure control valves of the anti-blocking system used for the drive control system can be controlled in their pressure increasing, pressure retaining and pressure reducing positions in the correct order and combination for control.

A further advantageous feature of the invention is the provision of simple embodiments of the circuit device and of a circuit element together with time elements and pulse generators for their control, with which the alternative or common control of the brake pressure control valves associated with the driving wheel brakes is effected.

Using the curved path recognition device described as part of the invention, the electronic analysis and control circuit receives the output signals of the wheel rotational speed sensors provided for the monitoring of the rotational speed of the non-driving front wheels of the vehicle which are used in an advantageously simple manner for the recognition of curved travel and for switching the drive control device to the driving wheel on the inside of the curve.

It is an object of the invention to provide an improved drive control for a motor vehicle.

Another object of the invention is to provide a drive control device of the type stated at the beginning, which can also be realized in conjunction with a 3 channel anti-blocking system and with only minimal extra technical effort and which, nevertheless, will provide an effective and improved drive control, which will satisfy practical requirements.

It is a further object of the invention to provide a first analysis stage which processes the output signal from a single rotational speed sensor associated with the drive shaft, which is a measure of the sum of the rotational speeds of the vehicle driving wheels, and the output signal from at least one wheel rotational speed sensor, which is a measure of the rotational speed of the non-driving vehicle wheels, to produce an output signal characteristic of the spin tendency of a driving wheel, wherein a second analysis state is provided, which processes the output signal from at least one of the wheel rotational speed sensors associated with the non-speed sensors associated with the non-driving vehicle wheels to produce signals characteristic of the state of movement of the vehicle, and wherein a switch device is provided, which is controlled by switch control signals from a connecting circuit, the input signals of which are the output signals of the first and second analysis stages, which switch device at the beginning of a control cycle takes up a switching position in which only the brake pressure control valve associated with the driving wheel on one side of the vehicle is operable, and, if the output signal from the first analysis stage and an acceleration signal from the second analysis stage are present simultaneously, the switch device maintains its switching position, and, if the output signal from the first analysis and the output signal from the second analysis stage characteristic of the steady state condition of the vehicle are present simultaneously and, with a time delay relative to the latter, the output signal from the first analysis stage and the deceleration signal from the second analysis stage are present simultaneously, the occurrence of the latter moves the switch device into a second position, which permits operation of the brake pressure control valve on the opposite side of the vehicle.

Figure 2:
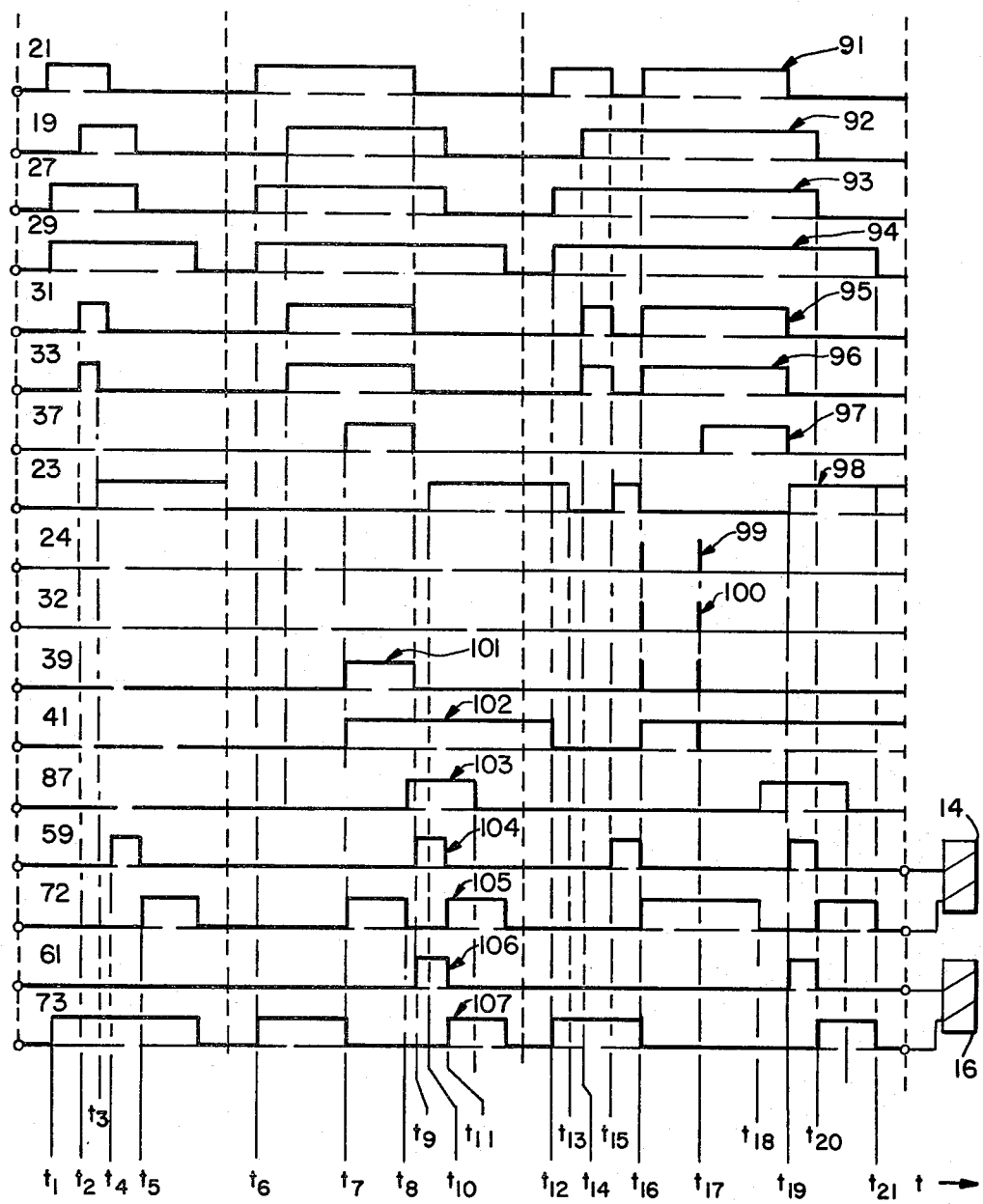

These and other objects, features, and advantages of the present invention will become more apparent from the following description when taken in connection with the accompanying drawings, wherein like features have like reference numerals, which show, for the purposes of illustration only, one embodiment in accordance with the present invention, and wherein:

FIG. 1 shows a circuit diagram of the electronic control unit of a drive control device according to the invention, and FIG. 2 shows a simplified pulse diagram to explain the function of the drive control device according to FIG. 1.

In FIG. 1, a drive control device according to the invention for a vehicle, which is also equipped with a 3 channel anti-blocking system, is represented by the simplified circuit diagram of its electronic control unit 10.

Although the invention is not so limited, it is assumed for the purposes of description and only for exemplary purposes, that the vehicle has a rear axle drive.

It is also assumed that included in the anti-blocking system is a wheel rotational speed sensor 11 and 12 for each front wheel of the vehicle, which produce pulse shaped electrical output signals, the pulse repetition frequency of which is proportional to the wheel rotational or peripheral speed of each front wheel, together with a rotational speed sensor 13, which also produces a pulse shaped electrical output signal, which is proportional to the sum of the wheel rotational or peripheral speeds of the driving rear wheels of the vehicle. This third rotational speed sensor 13, with conventional construction of the anti-blocking system, measures the rotational speed of the propeller shaft, by means of which the driven shaft of the vehicle gear box is drive-coupled with the differential gear of the rear axle. This rotational speed sensor 13 is preferably mounted on the casing of the differential gear of the drive axle (not shown).

An important characteristic feature of the drive control device 10 according to the invention consists in the fact that the already mentioned rotational speed sensor arrangement 11, 12, 13, which is provided within the anti-blocking system for determining the state of movement of the vehicle wheels, is used for an analogous purpose for the drive control device 10, to this extent no extra effort being required at all for the drive control device 10 compared with the anti-blocking system.

Contrary to a 3 channel anti-blocking system, in which the brake pressure control at the rear axle occurs via a single brake pressure control valve, however, the drive control device 10, which operates on the principle of braking a rear wheel tending to spin in order to make it possible to transfer a greater driving torque to the street or roadway at the driving wheel on the other side of the vehicle, requires two brake pressure control valves on the driving wheels, making possible separate control of the brake pressure on the two driven vehicle wheels individually. The additionally necessary brake pressure control valve requires, however, only a modification to the hydraulic actuator used for both the anti-blocking system and the drive control device 10 such that either a hydraulic actuator suitable for a 4 channel anti-blocking system is employed or the hydraulic actuator for the 3 channel anti-blocking system is supplemented by an additional brake pressure control valve, which is switched into one of the two pressure line branches which leads from the already available brake pressure control valve associated with the brake pressure control at the rear axle to one of the two brake calipers of the driving wheel brakes.

In FIG. 1, these brake pressure control valves 14 and 16 associated with the two driving wheel brakes for the right-hand rear wheel brake and the left-hand rear wheel brake are, for simplicity, indicated only by their control magnets, and it is assumed that the brake pressure control valves, as is usual with anti-blocking systems, are designed as 3/3 magnetic valves, which can be controlled to a through flow position, associated with the pressure increasing phase, a shut-off position, associated with the pressure retaining phase, and a return position, which is associated with the pressure reduction phase at the wheel brakes, these functional positions being used for the purpose of both the anti-blocking and drive control. An auxiliary pressure source, from which the brake pressure supplied for the driving wheel brakes occurs in the control phases of the drive control device, is shown schematically in the right-hand upper part of FIG. 1 and overall indicated by 17; this can, for example, be designed as a pressure accumulator, which can be connected, by means of a magnetic valve arrangement controlled by an output signal of the electronic control unit 10, which indicates that the drive control is in operation, to the brake pipe leading to the brake pressure control valves 14 and 16, this brake pipe being shut off from the main brake cylinder of the braking equipment simultaneously, i.e. during the control phases of the drive control device 10.

The electronic control unit 10 of the drive control device basically described up to now has the more detailed following construction:

There is a first analysis stage 18, which receives the output signal of the rotational speed sensor 13 associated with the drive axle and the output signal of at least one of the wheel rotational speed sensors 11 and/or 12 as input signals, the sensors 11 and/or 12 being associated with the front wheels of the motor vehicle-nondriving in the chosen illustrative case. The first analysis stage 18 produces a signal from the comparison of the output signal of the rotational speed sensor 13 and the output signal or signals of the at least one front wheel rotational speed sensor 11 and/or 12, this signal being proportional to the average of the total slip occurring at the driving vehicle wheels; from the comparison of this signal with a prescribed threshold value $\lambda_S$, the output signal is produced at a first output 19 of the analysis stage 18; this signal is output as a logic high level potential signal and shows that in the case of at least one of the driving vehicle wheels a threshold value $\lambda_S$, considered permissible, has been attained or exceeded.

From determination of the change with time of the output signal of the rotational speed sensor 13, i.e. a differentiation processing of the latter, the first analysis stage 18 produces a further signal which is proportional to the average of the wheel accelerations occurring at the driving vehicle wheels. From the comparison of this signal with a prescribed threshold value b+, the output signal is produced at a second output 21 of the analysis stage as a logic high level potential signal; this signal shows that the (b+) threshold value considered permissible has been attained or exceeded in the base of at least one of the vehicle driving wheels.

Also provided is a second analysis stage 22, which receives the output signal pulses of at least one of the two front wheel rotational speed sensors 11 and/or 12 as input signals. This second analysis stage 22 also determines the change with time of its input signals and produces a signal which is proportional to the vehicle acceleration (+b) or deceleration (−b). It compares this signal with prescribed threshold values of the vehicle acceleration or deceleration and gives out a high level signal as the logic output signal at its first output 23; this signal indicates that the vehicle acceleration is greater than the corresponding threshold value. The second analysis stage 22 gives out a high level signal as the logic output signal at its second output 24; this signal indicates that the vehicle deceleration has attained or exceeded a prescribed threshold value.

The electronic control unit 10 of the drive control device also includes a connection device, indicated overall by 26, which, from a logical connection between the output signals of the first and second analysis stages 18 and 22, described more precisely below, produces the control signals necessary for the control of the brake pressure control valves 14 and 16 appropriate to the control system.

In the embodiment shown, the connection device 26 includes a 2 input OR element 27, which receives the output signals of the first analysis stage 18 as input signals. To the output 28 of the OR element 27 is connected a delayed fall-off time element 29, the high level output signal of which controls the connection of the auxiliary pressure source 17 to the braking circuit of the driving vehicle wheels. The connection device 26 also includes a first 2-input AND element 31 which also receives the output signals of the first analysis stage 18 as input signals. The output signals of the OR element 27 and the (−b) output signals from the second input 24 of the second analysis stage 22 are supplied as input signals to a second 2-input AND element 32, also provided as part of the connection device. A third 2 input AND element 33, provided within the connection device 26, has a non-negated input 34, at which it receives the output signals of the first 2 input AND element 31 and a negated input 36, to which are conducted the (+b) output signals from the first output 23 of the second analysis stage 22.

At the output of the third 2-input AND element 33, a first delayed rise time element 37 is connected, which produces a high level signal after a characteristic delay period at its output 38, whenever the output signal of the third AND element 33 endures longer than this delay period, whereby the output signal of the time delay element 37 also falls with the drop in the output signal of the third AND element 33. The output signal of this time element 37 indicates that no change to the state of movement of the vehicle has occurred within the delay period after the drive control device has been activated and one of the wheel brakes has been supplied with brake pressure. It is supplied as one of a total of four different input signals to a 4-input OR element 39, the output signal of which controls a T flip flop 41, the output signal of which alters its level with every appearance of an input pulse. A return element 42 ensuring that the output signal of the T flip flop 41 at the beginning of a control phase of the drive control device 10 is always a low level signal. This return element is embodied as a 2 input AND element, which has a negated input 43, at which it receives the output signal of the delayed fall-off time element 29, and a non-negated input 44, to which is supplied the output signal of the T flip flop 41. The output signal of the 2 input AND element 42 is supplied to the 4 input OR element 39 as an input signal. As a further input signal, this OR element 39 also receives the output signal of the second 2-input AND element 32, which gives out a high level output signal whenever the vehicle experiences a sudden deceleration after a first activation of one of its wheel brakes during drive control.

Using the high and low level output signals of the T flip flop 41, it is possible to control a switch device 46, which takes up a first switch position corresponding to its basic position as long as the output signal T flip flop 41 is a low level signal and takes up its second position corresponding to the excited position, whenever the output signal of the T flip flop 41 is a high level signal. In the basic position of this switch device 46, which in the illustrative example shown is designed as a switch-over relay with two switchover contacts 47 and 48, the two outputs 19 and 21 of the first analysis stage 18 are connected with the inputs 49 and 51 of a first connection circuit 52, which produces the control signals necessary for controlling the brake pressure control valve 14 associated with the right-hand side rear wheel brake for the purpose of drive control from a logic connection of the (+b) and λ output signals of the first analysis stage 18. In the second switch position of the switchover relay 46, initiated by control by means of the high level output signal of the T flip flop 41, the outputs 19 and 21 of the first analysis stage 18 are connected with the inputs 53 and 54 respectively of a second connection stage 56, which produces the signals required for drive control for the control of the brake pressure control valve 16 associated with the left-hand side driving wheel brake from a corresponding connection of the (+b) and λ output signals of the first analysis stage. These connection stages 52 and 56 each contain a 2 input AND element 57 and 58 respectively with a non-negated input 49 and 53 respectively and a negated input 51 and 54 respectively, which also form the λ and (+b) signal inputs of the first and second connection stages 52 and 56. The right-hand side brake pressure control valve 14 and the left-hand side brake pressure control valve 16 respectively are controllable into their shut-off positions by means of the high level output signals from the outputs 59 and 61 respectively of the 2-input AND elements 57 and 58 respectively. The 2 connection circuits 52 and 56 also each contain a 3-input AND element 62 and 63 respectively which both have a non-negated input 64 and 66 respectively and a first and a second negated input 67, 68 and 69, 71 respectively. The output signal of the delayed fall-off time element 29 are supplied to the non-negated input 64 and 66 respectively of both the 3-input AND elements 62 and 63. The first negated input 67 and 69 respectively of both 3-input AND elements 62 and 63 is connected in each case with the output 59 and 61 respectively of the 2-input AND element 57 and 58 respectively of the connection circuit 52 and 56 respectively. The second negated input 68 and 71 respectively of the 3 input AND element 62 and 63 respectively of the first and second connection circuit 52 and 56 is connected in each case with the negated input 51 and 54 respectively of the 2 input AND element 57 and 58 respectively of the two connection circuits. Whenever the output signal produced at the outputs 72 and 73 respectively of the 3-input AND element 62 and 63 respectively is a high level signal, the right-hand side and left-hand side brake pressure control valves 14 and 16 respectively are directed into their return position, which in each case produces the pressure reduction phase in the appropriate wheel brake. The connection of the output signals of the first analysis stage 18 by means of the connection circuits 52 and 56 has the effect that, depending on the position of the switching device 46 at the output 59 or at the output 61 of the 2-input AND element 57 and 58 respectively, a pressure retaining control signal is produced, whenever only the λ output signal from the first analysis stage 18 is present and a pressure reduction control signal at the output 72 or 73 of the two 3-input AND elements 62 or 63 is initiated, if at least the (+b) signal of the first analysis stage 18 is present.

For the illustrative example shown, the right-hand rear wheel brake is activated whenever the auxiliary pressure source 17 is connected to the rear axle braking circuit by the output signal of the delayed fall-off time element 29 and the left-hand side brake pressure control valve is directed into its return position. The switch position of the switchover contacts 47 and 48 of the switchover relay 46 necessary for this purpose is shown in full lines. In the position indicated dotted for these switch contacts 47 and 48, the left-hand rear wheel brake can, on the other hand, be activated.

Assuming that, because of the predominance of driving on the right, a spin tendency will occur statistically more often on the right-hand driving wheel than on the left for the usual road conditions, the drive control device 10 is designed so that when it comes into operation, the right-hand driving wheel is braked first. However, since the driving wheel on the inside of the curve is unloaded while traveling in a curve and will generally therefore have the greater tendency to spin than the more heavily loaded driving wheel on the outside of the curve, it is advantageous, in such a case, if the braking action caused by the initiation of the control process occurs first on the driving wheel on the inside of the curve. In order to obtain this result, a curved path recognition device is provided, indicated overall by 76, which, if necessary, produces a control signal which directs the switching device 46 into its position shown dotted, in which the braking applied occurs on the left-hand side of the vehicle.

In the special illustrative example shown, the curved path recognition device 76 includes a comparator 77, which compares the output signals from the two front wheel rotational speed sensors 11 and 12 with one another and produces a high level output signal whenever the wheel rotational speed at the right hand front wheel is greater than that on the left. The curved path recognition device 76 also includes a 3-input AND element 78, which has 2 non-negated inputs 79 and 80 and one negated input 81. At the one non-negated input 79, this AND element 78 receives the output signal of the comparator 77, which indicates by high signal level that the vehicle is in a left hand curve and, at its other non-negated input 80 the output signal of the delayed fall-off time element 29, which continues as a high level signal as long as the drive control device 10 is operating. At the negated input 81, the 3-input AND element 78 receives the output signal of a delayed rise time element 85, to which is also supplied the output signal from the delayed fall-off time element 29 or the output signal of the OR element 27 of the connection device 26 as its input signal. The output signal of the 3-input AND element 78 is supplied to the 4-input OR element 39 as a further input signal so that operation of the T flip flop 41 also occurs at the rising flank of the output signal of the 3-input AND element 78, whenever at least one of the other possible input signals of this OR element 39 is not simultaneously present as a high level signal. The blocking of the 3-input AND element 78 with a time delay relative to the initiation of the control by means of the output signal of the delayed rise time element 85 has the effect that switching over to the left hand driving wheel brake due to the output signal of the comparator 77 alone is only possible at the beginning of a control process and, on the other hand, that the possibility of undesired switching over from one driving wheel brake ot the other being initiated by a rapid change from curved to straight line travel during the period of a control process is avoided.

If the output torque of the driving unit of the vehicle is too large, for example when driving away it can happen that only alternating spinning of the driving wheels is initiated due to the already mentioned alternating activation of the driving wheel brakes.

In order to prevent this, provision is made for the activation of both driving wheel brakes in such a case, and, in addition, the engine output torque is sufficiently reduced, for example by interfering with the fuel supply, so that the drive control can subsequently become effective and the vehicle accelerated in the forward direction, the engine torque being slowly increased again afterwards.

For this purpose, a switching element 82 is provided, which can be directed into a switching position with a time delay relative to the response of the switching device 46; this switching position connects the mutually corresponding inputs 49, 53 and 51, 54 respectively of the two connection circuits 52 and 56 and, as a consequence, both brake pressure control valves 14 and 16 are equally operated. This switching element 82 can, as shown, be designed as a closing relay with two working contacts 83 and 84, which short-circuit the fixed contacts of the switching relay 46 when the relay 82 is excited. The control signal for the switching element 62 is again derived by suitable time delay from the output signal of the third 2-input AND element 33 of the connection device 26. For this purpose, a second delayed rise time element 86 is connected after this AND element 33 and its delay time is somewhat larger than that of the first delayed rise time element 37 and, for example, corresponds to double the delay of the latter. A delayed fall-off time element 87, the output signal of which excites the closing relay 82, is connected after this second delayed rise time element 86.

Using the output signal from this time element arrangement 86, 87, an actuator 88 can also be operated, which produces a reduction of the engine torque in an appropriate fashion, for example by interfering with the fuel supply, the ignition equipment or by adjusting the throttle of the motor vehicle.

In order to explain the function of the drive control device 10 according to FIG. 1, attention is now drawn to FIG. 2 in which the variation with time of the output signals of important functional components of the drive control device 10 is represented in the form of a pulse diagram for three control processes I, II and III, which are considered typical. In this diagram, the following output signals are represented by the pulse series 91 to 107; the acceleration output signal of the first analysis stage 18 shown at the output 21, the slip output signal shown at output 19 of this analysis stage. Using reference numerals corresponding to the elements of FIG. 1, FIG. 2 shows the output signal of the OR element 27, the output signal of the delayed fall-off time element 29 connected after the latter, the output signal of the first AND element 31 of the connection device 26, the output signal of the third AND element 33, the output signal of the first delayed rise time element 37 connected after the latter, the (+b) output signal 23 of the second analysis stage 22, the (−b) output signal of the second analysis stage 22, the output signal of the second AND element 32 of the connection device 26, the output signal of the 4 input AND element 39, the output signal of the T flip flop 41, the output signal of the time element arrangement 86, 87, the pressure retaining control signal of the first connection circuit 52 for the right hand brake pressure control valve 14, the pressure reduction control signal of this connection circuit 52 also for the right hand brake pressure control valve, the pressure retaining control signal of the second connection circuit 56 for the left hand brake pressure control valve 16 and the pressure reduction control signal of this second connection circuit 56 also for the left hand brake pressure control valve 16.

For the control process occurring during the time interval I, it is assumed that the vehicle is to drive away, whereat the right driving wheel spins. This is indicated by the fact that the (+b) signal 91 occurs at the time $t_1$ and with it the output signal 93 of the 2-input AND element 27 together with the output signal of the delayed fall-off time element 29 and the pressure reduction control signal 107 for the left hand side brake pressure control valve 16; with the occurrence of the output signal 94, the auxiliary pressure source 17 is connected to the braking circuit of the driving vehicle wheels, the right hand side driving wheel brake, the brake pressure control valve 14 of which remains in its basic position, is now activated. With the occurrence of the λ output signal 92 at the time $t_2$, the high level output signal 95 of the first AND element is also released as is the output signal 96 of the third AND element 33, which decreases again as soon as the (+b) output signal of the second analysis stage 22 occurs at the time $t_3$, which indicates that the vehicle is accelerating and thus that the "correct" wheel brake has been activated. As a result, the (+b) output signal 91 of the first analysis stage 18 decreases at the time $t_4$ and with it also the output signal 95 of the first AND element 31. Simultaneously, the pressure retaining signal 104 for the right hand side brake pressure control valve 14 is produced at the output 59 of the first connection circuit 52 and this remains until the λ output signal of the first analysis stage 18 also decreases at the time $t_5$. The fall-off of this signal indicates that an effective drive control at the right hand driving wheel of the vehicle has occurred. Simultaneously, the pressure reduction signal 105 is released at time $t_5$ at the output 72 of the first connection circuit 52 and the concluding pressure reduction phase now takes place at both driving wheel brakes until the control procedure is ended with the reduction of the output signal 94 of the delayed fall-off time element 29, whereby the auxiliary pressure source 17 is disconnected from the braking circuit of the driving wheels and the brake pressure control valves 14 and 16 return to their basic position.

It is also assumed for the control process occurring during the time interval II that the vehicle is to drive off whereby, in contrast to the control process I, it is assumed that the left hand side driving wheel tends to spin and thus, due to the activation of the right hand driving wheel brake at the time $t_6$, a supporting torque is produced, which could lead to an increased driving torque transfer between the vehicle and the roadway. In consequence, at the time $t_7$ after the delay time of the first delayed rise time element 37, a high level signal 97 occurs at the output 38 of the element and the rising flank of this high level signal 97 releases the output signal 102 of the T flip flop 41, which now switches over to the left hand rear wheel brake. Due to this switchover, the pressure reduction control signal 105 for the brake pressure control valve 14 of the right hand rear wheel brake is released at the time $t_7$ and the left hand rear wheel brake activated due to the simultaneous fall in the pressure reduction signal 107.

It is further assumed that no reduction in the total wheel acceleration or slip appearing at the driving axle occurs even with the braking of the left hand driving wheel because the right hand driving wheel is now spinning again so that the (+b) and λ output signals of the first analysis stage and, consequently, also the output signal 97 of the third AND element 33 of the connection device 26 remain present. As a result, the output signal 103 of the time element arrangement 86, 87 is released at the time $t_8$ and the switching element 82 operated, whereupon the wheel brakes of both driving wheels now receive a supply of pressure until, at the time $t_9$, the (+b) output signal of the first analysis stage 18 decreases and, simultaneously, both brake pressure control valves 14 and 16 are directed into their shut-off positions by the pressure retaining control signals 104 and 106. At the time $t_{10}$, the (+b) output signal 98, for example, of the second analysis stage 22 occurs, which shows that the vehicle is starting to move. With the subsequent reduction of the λ output signal of the first analysis stage 18, the two brake pressure control valves 14 and 16 are directed into their pressure reduction position at time $t_{11}$ until, with the time delayed fall-off of the output signal 94 of the time element 29, the control process is ended and the brake pressure control valves 14 and 16 also return to their basic position.

For the control process taking place in the time interval III, it is assumed that this takes place immediately subsequent to the previously occurring control process II, whereby the vehicle, indicated by the still present (+b) output signal 98 of the second analysis stage 22 is in a state of accelerated forward motion. At the time $t_{12}$, the (+b) output signal of the first analysis stage 18 indicates that one of the driving rear wheels tends to spin. In consequence, the left hand side brake pressure control valve 16 is directed into its pressure reduction position at the time $t_{12}$ and the right hand driving wheel brake activated. It is assumed that the right hand driving wheel then also tends to spin. Because of this tendency to spin and the deterioration in the drive torque transfer between the vehicle and the roadway associated with it, the driving acceleration of the vehicle is reduced and consequently, for example at the time $t_{13}$, the (+b) output signal of the second analysis stage 22 falls. At the time $t_{14}$, the λ output signal 92 of the first analysis stage 18 has appeared, with which the output signals 95 and 96 of the first AND element 31 and the third AND element 33 of the connection device 26 have also appeared for the first time. Since the "correct" wheel brake has been initially activated, the (+b) output signal 91 of the first analysis stage 18 decreases again at the time $t_{15}$. In consequence, the pressure retaining output signal at output 59 of the first connection circuit is produced simultaneously for the right hand side brake pressure control valve 14. Despite effective braking of the right hand driving wheel, which is tending to spin, it is assumed that the slip output signal 92 continues to be present because the vehicle now runs, for example, with its left hand driving wheel on a part of the roadway surface with a particularly low force transmission coefficient with the effect that this driving wheel now tends to spin, indicated by the renewed appearance of the (+b) output signal of the first analysis stage at the time $t_{16}$.

The right hand side driving wheel brake is thus activated again at the time $t_{16}$ but with the consequence that there is now a sudden deceleration of the vehicle, indicated by the appearance of the (−b) output signal of the second analysis stage 22. This output signal releases the high level output signal 102 of the T flip flop 41, practically at the time $t_{16}$, and thus initiates the switchover to the left hand driving wheel brake. For the further process, it is assumed that the (+b) and the λ output signals of the first analysis stage 18 remain present because at least one of the two driving wheels continues to tend to spin. As a consequence, the high level output signal 97 of the first delayed rise time element 37 is released at the time $t_{17}$, which briefly causes a switchover again to the right hand driving wheel brake, whereby, however, the "wrong" driving wheel is again braked and again a short period (−b) output signal is produced by the second analysis stage 22, which again produces switching back to the left hand driving wheel brake. Finally, at time $t_{18}$, both driving wheel brakes are activated with the appearance of the output signal 103 of the time element arrangement 86, 87, whereupon, at time $t_{19}$, the desired drive acceleration of the vehicle, indicated by the appearance of the (+b) output signal of the second analysis stage 22 and the reduction of the (+b) output signal of the first analysis stage 18, occurs and both brake pressure control valves 14 and 16 are directed into their pressure retaining position until, at time $t_{20}$, the λ output signal 92 of the first analysis stage 18 decreases and both brake pressure control valves 14 and 16 are directed into their pressure reduction position until, at the time $t_{21}$ after the delay period of the delayed fall-off time relay 29, its output signal 94 also decreases and the control process is ended.

The drive control device 10 according to the invention is particularly suitable for the case of the comprehensively described illustrative example, i.e., for a vehicle with driving rear axle and non-driving front wheels. It is, however, obvious that the invention can also be used advantageously, for example, for a vehicle with more than one driving axle, for example on a vehicle with all wheel drive or on a vehicle with non-driving front axle and two driving rear axles; the appropriate changes to the drive control device necessary for this purpose may be considered as within the range of expert knowledge.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A drive control for a motor vehicle equipped with an anti-blocking system and wheel rotational speed sensors for determining the state of movement of the driving and non-driving wheels, the drive control providing for control cycles in the course of which a driving wheel which is tending to spin is slowed down by actuating its associated wheel brake and comprising brake pressure control valves which are individually associated with the brakes of the driving wheels of the vehicle and are electrically controllable into one of a pressure-increasing, a pressure-reducing and a pressure-retaining phase, an electronic control means for processing the output signals from the wheel rotational speed sensors to produce control signals by means of which the brake pressure control valves can be directed into functional positions in the order and combination necessary for drive control, in which positions an auxiliary pressure source is connected to brake calipers of the wheel currently requiring braking and shut off from the brake calipers of the wheel not requiring braking, a first analysis means for processing the output signal from a single rotational speed sensor associated with a drive shaft of the motor vehicle, which is a measure of the sum of the rotational speeds of the vehicle driving wheels, and the output signal from at least one wheel rotational speed sensor, which is a measure of the rotational speed of the non-driving vehicle wheels, for producing an output signal characteristic of the spin tendency of a driving wheel, a second analysis means for processing the output signal from at least one of the wheel rotational speed sensors associated with the non-driving vehicle wheels for producing signals characteristic of the state of movement of the vehicle, and a switch means controlled by switch control signals from a connecting circuit means, the input signals of being the output signals of the first and second analysis means, for providing the following functions within a control cycle:

a. at the beginning of a control cycle, initiated by the output signal of the first analysis means indicating that at least one driving wheel is tending to spin, the switch means takes a first position in which only the brake pressure control valve associated with the driving wheels on one side of the vehicle is operable;

b. if the output signal from the first analysis means and an acceleration signal from the second analysis means are present simultaneously, indicating that, as a result of activating the brake of the driving wheel of that one side of the vehicle, an acceleration of the vehicle is obtained, the switch means maintains the said switching position in which only the valve associated with the driving wheel on that one side of the vehicle is operable;

c. if the output signal from the first analysis means and the output signal from the second analysis means which is characteristic of the steady state of motion condition of the vehicle are present simultaneously, indicating that the state of motion of the vehicle is not affected by the previous activation of the firstly operable brake, then, with a time delay relative to the steady state condition signal, the switch means takes a second switching position for operating the brake pressure control valve on the opposite side of the vehicle;

d. if the output signal of the first analysis means and a deceleration signal of the second analysis means are present simultaneously, indicating that activation of the firstly operable brake does not result in the desired acceleration of the vehicle but in a deceleration thereof, the occurrence of the latter moves the switch means into its second position for operating the brake pressure control valve on the opposite side of the vehicle.

2. A drive control according to claim 1, further comprising:
a delay means is provided which, in the case of the simultaneous appearance of the output signal of the first analysis means and the output signal of the second analysis means characteristic of the steady state condition of the vehicle, after a prescribed delay time, which is longer than the delay time after which the switchover of the said switch means occurs for producing a control signal by means of which a second switching means is directed into a switching position to activate driving wheel brakes on both sides.

3. A drive control according to claim 2, further comprising
means for initiating a reduction of the torque from the driving unit of the vehicle in response to a control signal from the delay means.

4. A drive control device according to claim 1 further comprising
means for directing the switch means into a selected initial switching position at the beginning of each control cycle.

5. A drive control according to claim 4, wherein the initial switching position of the switch means produces activation of the wheel brake on the side of the vehicle away from the opposing traffic.

6. A drive control according to claim 5, further comprising
a curved path recognition means for directing, in the case of a curved path, the switch means into that switching position for which the first wheel brake to be activated is that of the driving wheel on the inside of the curve path.

7. A drive control according to claim 6, wherein a wheel rotational speed sensor is provided on both sides of the vehicle for each non-driving vehicle wheel, further comprising
a comparator receiving the output signals of said sensors, means for producing an output signal to initially actuate the said switch means whenever the wheel rotational speed is greater on that side of the vehicle containing that driving wheel brake which would be first activated in the basic position of the first switch means when the drive control responds.

8. A drive control according to claim 7, further comprising
a 3-input AND means receiving the output signal of the comparator at a first non-negated input, at a second non-negated input the delayed fall-off output signal of the connecting circuit means, and at a third negated input a signal derived by rise delay of a delayed fall-off output signal of the connecting circuit means, resulting from the output signals of the first analysis means, the rising flank of the output signal of the 3-input AND means effecting actuation of a pulse generating means by the output pulses of which the switch means is controlled.

9. A drive control according to one of claims 1 through 8, wherein said first analysis means comprises
means comparing the output signals of the wheel rotational speed sensors for producing a signal associated with the slip of the driving wheel currently tending to spin and for differentiating the first input signal to produce a b signal associated with the wheel acceleration of the driving wheel tending to spin and for comparing the and b signals with prescribed minimum threshold values respectively to produce for each a characteristic first logic output signal when the respective minimum threshold value is exceeded, the first logic signal as the output signals of the first analysis means being fed to the connecting circuit means, and wherein
the second analysis means comprises
means for differentiating the output signal of at least one of the wheel rotational speed sensors provided for a non-driving vehicle wheel to produce one of an acceleration and deceleration signal characteristic for the dynamic behavior of the vehicle and for comparing said one with corresponding threshold values to produce a second logic output signal at a first output which indicates that the acceleration at least corresponds to the associated (+b) threshold value and, at a second output to produce a logic output signal, which indicates that the vehicle deceleration at least corresponds to the associated (−b) threshold value, the second logic output signals being the output signals of the second analysis means which are fed to the connecting circuit means.

10. A drive control according to claim 9, wherein the connecting circuit means has a 2-input OR element, which receives the (+b) and λ output signals of the first analysis means as input signals, and a first 2-input AND element, which receives the (+b) and (−b) output signals of the first analysis means as input signals, and a second 2-input AND element, which receives the output signal of the 2-input OR element and the (−b) output signal of the second analysis means as input signals, and wherein a third 2-input AND element is provided, which has a negated input to which is conducted the (+b) signal of the second analysis means, and a non-negated input, to which is conducted the output signal of the first 2-input AND element, and further comprising a first delayed fall-off time means receiving the output of the OR element for producing a high level output signal to control the connection of the auxiliary pressure source to the braking circuit of the driving vehicle wheels.

11. A drive control according to claim 10 wherein the motor vehicle comprises brake pressure control valves in the basic position of which an increase of pressure occurs in the currently operating wheel brake when the auxiliary pressure source is connected, these pressure control valves being controllable by a first control signal into a shut-off position corresponding to a pressure retaining phase and by a second control signal into a return position associated with the pressure reduction phase on the currently operating wheel brake and, to produce these control signals, the drive control further comprises second individually associated connection circuits are provided for the brake pressure control valves receiving the output signals of the first analysis means by one of alternate mode and simultaneous mode as input signals depending on the switching position of the switch means and of second switch means for producing a pressure retaining control signal whenever only the λ output signal of the first analysis means is present and the brake pressure control valve of the driving wheel to be braked is directed into its pressure increasing position and the other brake pressure control valve into its pressure reducing position whenever at least the (+b) signal of the first analysis means is present.

12. A drive control according to claim 11 further comprising a first delayed rise time means receiving the output of the third AND element for producing an output signal to release the switchover of the switch means and produce alternative operation of the brake pressure control valves of the driving wheel brakes.

13. A drive control device according to claim 12 wherein the second connection circuits for producing the first and second control signals each comprise a fourth 2-input AND means with a non-negated input and a negated input, which by operation of the switch means can be connected alternatively to the λ and b signal output respectively of the first analysis means, and a 3-input AND element, which has a non-negated input, which is connected to the output of the first delayed fall-off time means connected to the output of the 2-input OR element, and two negated inputs of which one is connected to the output of the fourth 2-input AND means and the other to the negated input of said fourth 2-input AND means, and wherein the output of the fourth 2-input AND means is connected to the pressure retaining control connection of the associated brake pressure control valve and the output of the 3-input AND element to the pressure reducing control connection of the associated brake pressure control valve.

14. A drive control device according to claim 13 wherein the first switch means comprises a switchover relay, the working contacts of which in the basic position of the switchover relay connect the outputs of the first analysis means with the inputs of the fourth 2-input AND means of the connection circuit, which is associated with the wheel brake to be activated first, second OR means receiving the output signals of the first delayed rise time means and the output signals of the second 2-input AND element of the connecting circuit means for generating a control signal and a pulse generating means for releasing the excitation of said relay in response to the control signal.

15. A drive control device according to claim 12 further comprising a second delayed rise time means whose delay time is greater than that of the first delayed rise time means, said second delayed rise time means, also receiving the output of the third AND element of the connecting circuit means, and a second delayed fall-off time means whose delay time is smaller and corresponding to that of the first delayed rise time means, said second delayed fall-off time means receiving the output of the second delayed rise time means and the output signal of said second delayed fall-off time means being used for controlling the switching element to switch to a position in which the signal inputs of the fourth 2-input AND means of the connection circuits individually associated with the pressure control valves are connected with one another and the b signal inputs of the said fourth 2-input AND means are connected with one another, the inputs of the fourth 2-input AND means being connected to the output of the first analysis means, and the b inputs of the fourth 2-input AND means being connected to the b output of the first analysis means.

* * * * *